Nov. 7, 1933.  I. E. McCABE  1,934,200

ELECTRIC SWITCH MOUNTING

Filed March 13, 1931

INVENTOR
IRA E. McCABE
BY Langdon Moore
ATTORNEY

Patented Nov. 7, 1933

1,934,200

UNITED STATES PATENT OFFICE 1,934,200

ELECTRIC SWITCH MOUNTING

Ira E. McCabe, Chicago, Ill.

Application March 13, 1931. Serial No. 522,430

1 Claim. (Cl. 200—59)

This invention relates to improvements in electric switches and more particularly to a mounting for a mercury tube switch.

It is customary in motor vehicles not only to provide a red tail light to be illuminated when the vehicle is parked at night but also to provide a lamp, usually in conjunction with the red tail light, which will be illuminated whenever the operator applies power to the foot lever to operate the vehicle brake, thereby causing the tail light to flash red as a signal to following traffic that the vehicle is slowing down its speed of movement and is about to stop.

It is one object of this invention to provide a simple, inexpensive and positively acting switch for operating the brake light signal of a motor vehicle which may be applied as well to any vehicle for the same purpose whether motorized or not.

With these and other objects in view reference is made to the accompanying sheet of drawing which illustrates a preferred form of this invention with the understanding that minor detail changes may be made without departing from the scope thereof.

In the drawing—

Figure 3:
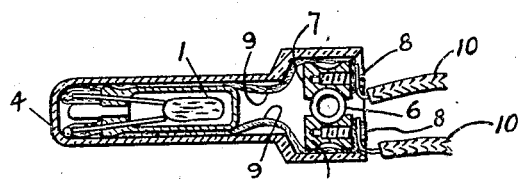
Figure 3 is a longitudinal sectional view, taken on the line 3—3, Figure 2.

Motor vehicles are customarily provided with a storage battery for operating the vehicle's headlights, parking lights and tail lights. It is also customary to furnish a switch in this lighting system which is operated whenever the brakes are applied by the foot lever to illuminate a lamp behind the red glass of the tail light and maintain this red signal light as long as the operator's foot operates the foot lever to apply the brakes. Such switches, at present, are usually located at inconvenient places for repair or replacement.

This invention contemplates the use of a commercial mercury tube switch 1 mounted adjacent the foot lever 2 for operating the vehicle brake, preferably carried upon a bracket 3 upon the floor board (not shown) and at one side of the foot lever 2. The mercury tube switch 1 is mounted within a flexible sleeve 4 of rubber, or other flexible insulating material, customarily closed at one end with the open end secured to the bracket 3 which will normally hold the switch in the "off" or open position. The side of the foot lever 2 is provided with an operating stud 5 so arranged as to actuate the switch whenever the foot lever is depressed and allow or cause the switch to open the circuit when the foot lever returns to its normal position.

Figure 1:
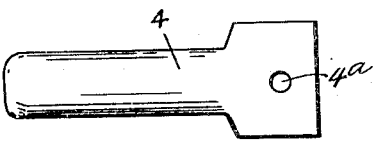
Figure 1 is a top plan view of the switch mounting.
Figure 2:
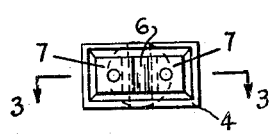
Figure 2 is a view in end elevation of Figure 1.

Figures 1, 2 and 3 illustrate the mercury tube switch 1 mounted within the closed end of a flexible sleeve 4, the flexible walls of the sleeve engaging the switch tube 1 to securely hold it in the position shown in Figure 1. The open end of the sleeve 4 embraces a bushing 6 supporting insulated binding post supports 7 between the bushing 6 and the embracing walls of the sleeve 4, as shown in Figure 2, provided with binding screws 8 for connecting the respective leads 9 of the switch to the wires 10 of the battery or other source of electricity. The flexible switch carrying sleeve 4 is secured to the bracket 3 by passing a bolt 11 through aperture 4a provided in the sleeve registering with the bushing 6, the bushing 6 and bracket, as shown in Figures 4 and 5.

Figure 4:
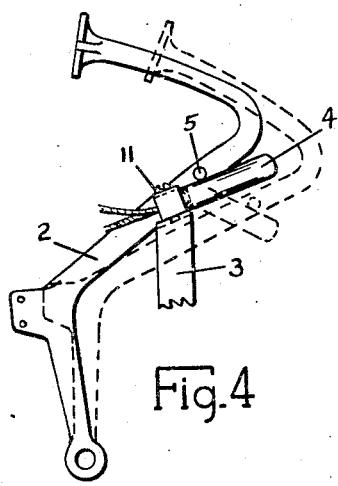
Figure 4 is a view in side elevation of an application of one form of this invention.
Figure 5:
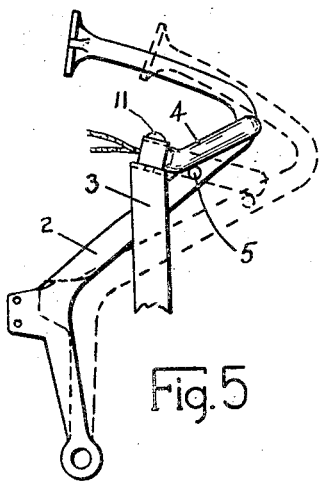
Figure 5 is a similar view of another form of application.

In Figures 4 and 5, the foot operating lever is shown in full lines in its normal position and in dotted lines the position assumed when it is operated to apply the brakes. In Figure 4 the bracket 3 supports the switch carrying sleeve 4 at an angle that the mercury therein flows away from its terminals to open the circuit. In this case the operating stud 5 is arranged on the foot lever 2, so that when the lever 2 is in normal position the stud 5 extends over the switch carrier 4 and when the lever is depressed to operate the brakes will slidably engage the upper surface of the switch carrier 4 and flex it, as shown in dotted lines, to cause the mercury to flow into engagement with the switch terminals to close the circuit therethrough and when the foot pressure is released and the foot lever returns to its normal position, the flexibility of the switch carrying tube 4 returns the switch to the open position. In Figure 5, the bracket 3 supports the switch carrier at such an angle that it normally causes the switch to assume the open position. In this case, the operating stud 5 is so arranged upon the foot lever 2 as to engage the underside of the switch carrier and in normal position to flex the switch carrier to the open position, so that as the foot lever 2 is depressed, the stud 5 will allow the flexible switch carrying tube 4 to flex and cause the switch to close the circuit therethrough.

Figure 6:
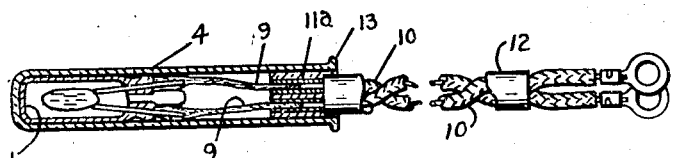
Figure 6 is a top plan view of another form of switch mounting, with parts broken away and partly in section.
Figure 7:
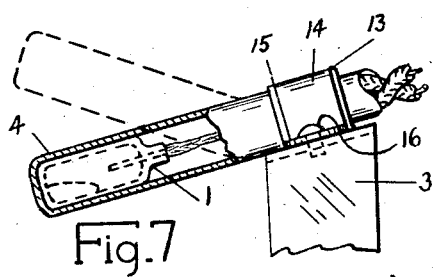
Figure 7 is a detail view in side elevation of an application of the mounting illustrated in Figure 6.

Figures 6 and 7 illustrate another manner of mounting the switch tube 1 within the flexible carrier 4 and another manner of attaching the carrier to the bracket 3. In this form a cylindrical insulating block 11ª is provided having perforations to receive the ends of the switch leads 9 and wires 10 which may be soldered to each other and then received with the block 11ª, as shown. The outer end of the block 11ª is recessed to receive the end of an insulating sleeve 12 surrounding the outer surfaces of the insulated wires leading to the source of current. It is preferable to provide a bead or flange 13 about the open end of the flexible tube 4 adapted to be engaged by a strap 14 having perforated ears on each side adapted to engage the bracket 3 and secure the carrier thereto by the bolts 16.

From the above description, it is seen that while the flexible sleeve 4 not only provides a resilient hinge but also protects the fragile mercury tube switch, and when formed of rubber or other elastic material will hold the mercury tube upon insertion at the closed end of the sleeve at a sufficient distance from the binding posts embraced by the open end to allow the body of the sleeve between the mercury tube and binding posts to flex in the manner of a spring hinge.

Should the flexible portion of the sleeve 4 deteriorate or become broken, the switch in Figure 1 would fail to return to the "off" position as the foot lever returns to normal and may be said to fail on the safe side as the signal would remain "on" and in Figure 2 it would cause a complete rupture of the sleeve before the switch would fail to be operated by the movement of the foot lever.

Figure 8:
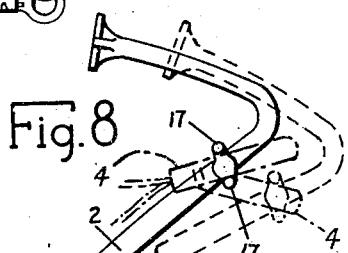
Figure 8 is a view similar to Figure 4 of another form of this invention.

Figure 8 illustrates another form of this invention in which the foot lever 2 is provided with a pair of spaced apart studs 17 so arranged to slidably engage both the upper and lower surfaces, respectively, of the flexible sleeve 4 when mounted as shown in Figure 4, whereby upon depression of the foot lever the upper stud 17 will flex the sleeve to close the circuit and upon release of the foot lever and as it returns to normal the under stud 17 will return the sleeve 4 to normal, causing the circuit to be broken, providing a double acting means of operation.

While this invention has been illustrated and described in its preferred form, that is including an elastic and flexible switch carrying sleeve for the switch, any other form of resilient hinged switch carrier which will operate in the same manner may be employed without departing from the scope of the invention.

It has been attempted heretofore to mount a mercury tube switch upon the foot lever for the purpose of controlling a brake signal without success, because to be operative the mercury tube has to be attached at such an angle that the vibration of the motor vehicle, and especially when traveling over rough ground, disturbs the mercury in the switch tube, causing it to vibrate back and forth within the tube and intermittently make and break the circuit rendering the tail light signal ineffective on a brake signal. Not only does the invention overcome this difficulty by flexibly mounting the mercury tube on a bracket independent of the foot lever at an angle which prevents sufficient movement of the mercury in the tube to close the circuit until the foot lever is depressed to apply the brake, but also provides a waterproof and resilient protection covering for the glass mercury tube preventing water or other foreign matter as well as unexpected blows from injuring this delicate mechanism.

What I claim is:

A brake light switch adapted to be mounted on a bracket adjacent to the foot brake lever and be actuated by the movement thereof, including a flexible sleeve of insulating material closed at one end, a mercury tube switch in engagement with the closed end and embraced by the sleeve having lead wires extending from the switch to binding posts spaced apart from the switch within the sleeve, and means to secure the binding posts and sleeve to the bracket normally supporting the mercury tube switch at such an angle as to operate it in one direction, the portion of the sleeve between the switch and binding posts providing a spring hinge, and means upon the brake lever adapted upon application of the brake to operate the switch in the opposite direction.

IRA E. McCABE.